US010895928B1

(12) United States Patent
Dabell

(10) Patent No.: US 10,895,928 B1
(45) Date of Patent: *Jan. 19, 2021

(54) METHOD AND APPARATUS FOR EMULATING TOUCH AND GESTURE EVENTS ON A CAPACITIVE TOUCH SENSOR

(71) Applicant: Steve Dabell, Spokane, WA (US)

(72) Inventor: Steve Dabell, Spokane, WA (US)

( * ) Notice: Subject to any disclaimer, the term of this patent is extended or adjusted under 35 U.S.C. 154(b) by 6 days.

This patent is subject to a terminal disclaimer.

(21) Appl. No.: 16/114,368

(22) Filed: Aug. 28, 2018

Related U.S. Application Data

(63) Continuation of application No. 14/794,012, filed on Jul. 8, 2015, now Pat. No. 10,088,940.

(51) Int. Cl.
| | |
|---|---|
| G06F 3/041 | (2006.01) |
| A63F 13/214 | (2014.01) |
| G06F 3/046 | (2006.01) |
| G06F 3/0354 | (2013.01) |
| G06F 3/044 | (2006.01) |

(52) U.S. Cl.
CPC .......... *G06F 3/0416* (2013.01); *A63F 13/214* (2014.09); *G06F 3/03545* (2013.01); *G06F 3/044* (2013.01); *G06F 3/046* (2013.01); *G06F 3/0414* (2013.01); *G06F 2203/04104* (2013.01); *G06F 2203/04106* (2013.01)

(58) Field of Classification Search
None
See application file for complete search history.

(56) References Cited

U.S. PATENT DOCUMENTS

| | | | | |
|---|---|---|---|---|
| 8,390,582 | B2* | 3/2013 | Hotelling | G06F 3/044 345/173 |
| 8,766,954 | B2* | 7/2014 | Vuppu | G06F 3/044 345/179 |
| 8,866,767 | B2* | 10/2014 | Shahparnia | G06F 1/26 345/173 |
| 8,872,792 | B2* | 10/2014 | Bakken | G06F 1/26 345/174 |
| 8,947,379 | B2* | 2/2015 | Bakken | G06F 3/03545 178/19.01 |
| 9,160,331 | B2* | 10/2015 | Bakken | G06F 3/044 |
| 10,162,400 | B2* | 12/2018 | Shahparnia | G06F 1/3203 |
| 2010/0006350 | A1* | 1/2010 | Elias | G06F 3/03545 178/18.06 |
| 2011/0057670 | A1* | 3/2011 | Jordan | G06F 3/0416 324/679 |
| 2011/0122087 | A1* | 5/2011 | Jang | G06F 3/044 345/174 |

(Continued)

*Primary Examiner* — Seng H Lim

(57) ABSTRACT

It is an object of the present invention to provide an apparatus and method for emulating touch and gesture events on a capacitive touch sensor array comprising: an electric field detection means for measuring the electric field intensity emitted as a function of time from a plurality of scan electrodes of said capacitive touch sensor array; and an electric field synthesizing means to create time variant electric fields coincident to electric fields emitted from said plurality of scan electrodes; and a capacitive coupling means to couple said synthesized electric fields to said plurality of electrodes inducing voltages which emulate time sequential touch events at said plurality of emulated touch locations animating said emulated gesture movement.

20 Claims, 7 Drawing Sheets

(56) References Cited

U.S. PATENT DOCUMENTS

| | | | | |
|---|---|---|---|---|
| 2011/0304577 | A1* | 12/2011 | Brown | G06F 3/03545 345/174 |
| 2012/0327041 | A1* | 12/2012 | Harley | G06F 3/03545 345/179 |
| 2013/0106760 | A1* | 5/2013 | Pedersen | G06F 3/03545 345/174 |
| 2015/0301646 | A1* | 10/2015 | Caldwell | G06F 3/0412 345/174 |

* cited by examiner

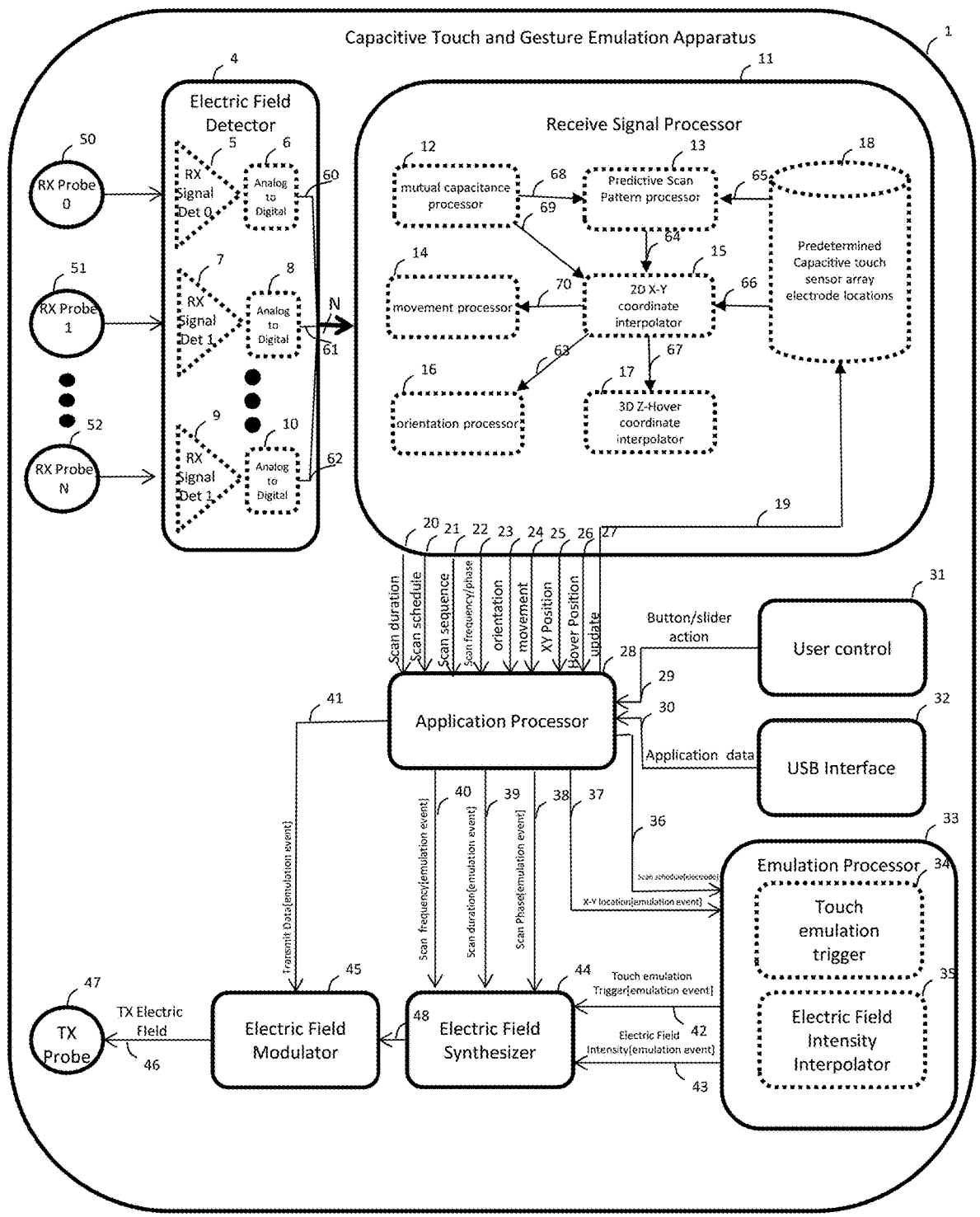
Figure 1. Capacitive Touch and Gesture Emulation Apparatus

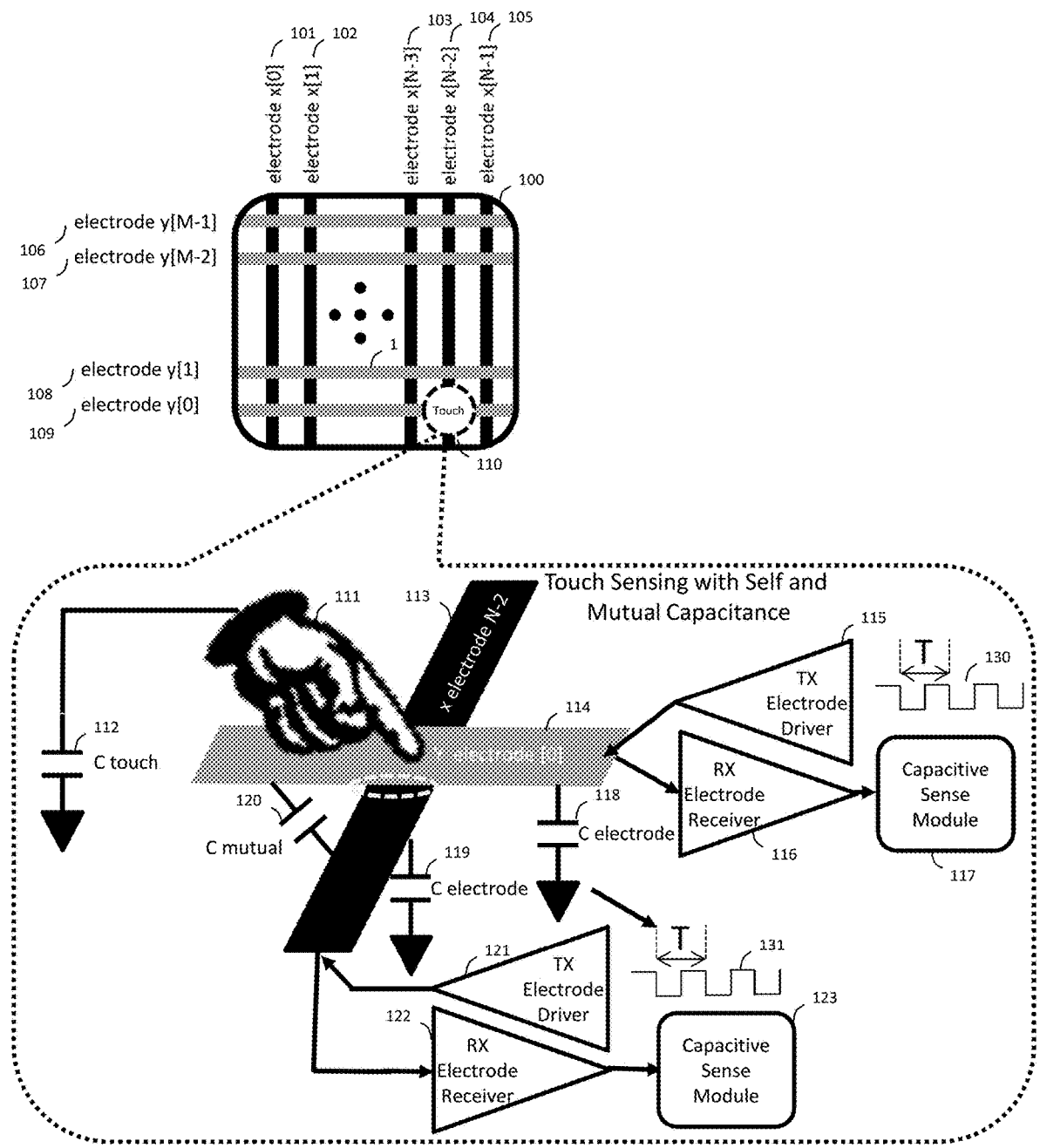
Figure 2. Capacitive sensor array operation with finger touch

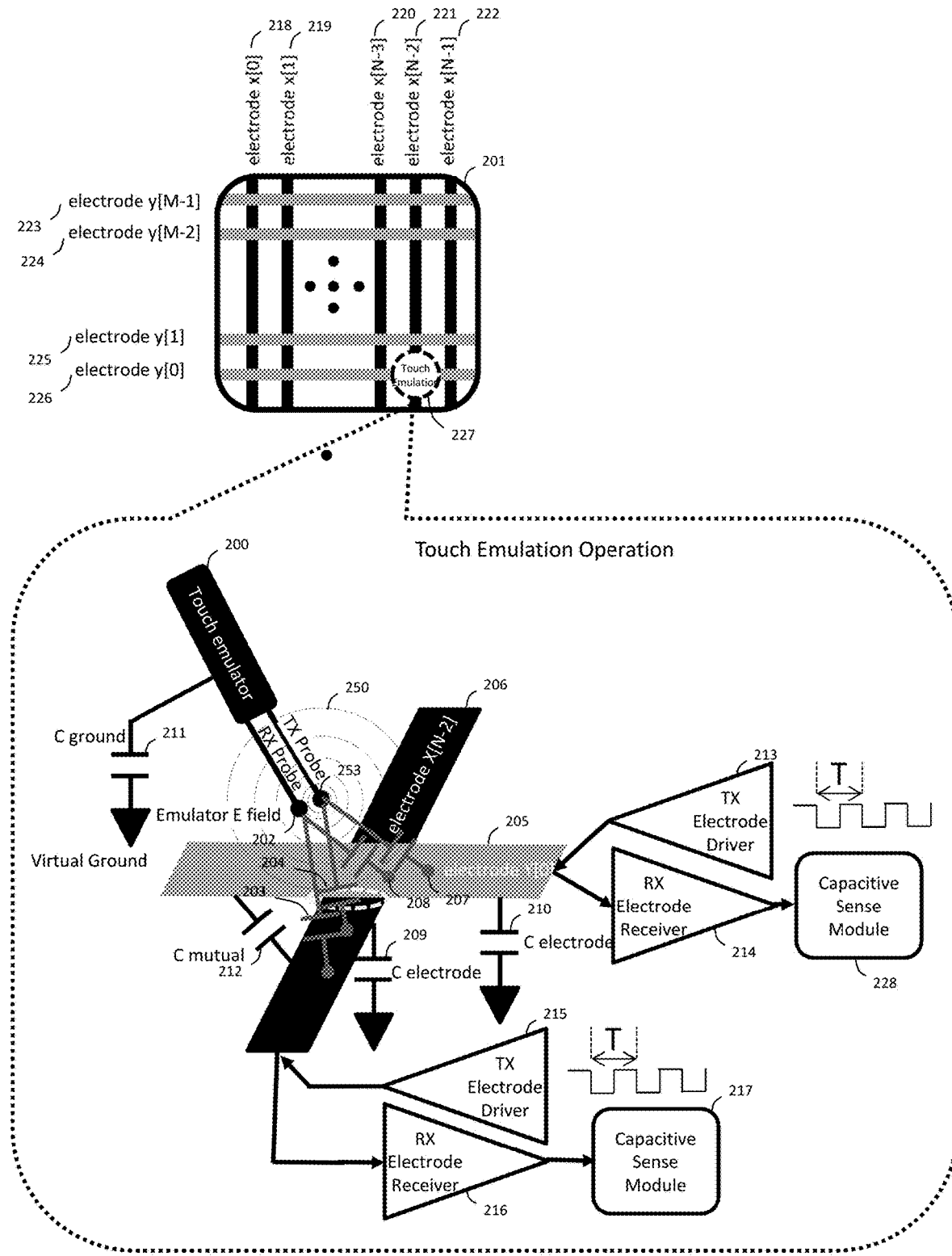
Figure 3. Capacitive sensor array with emulated touch

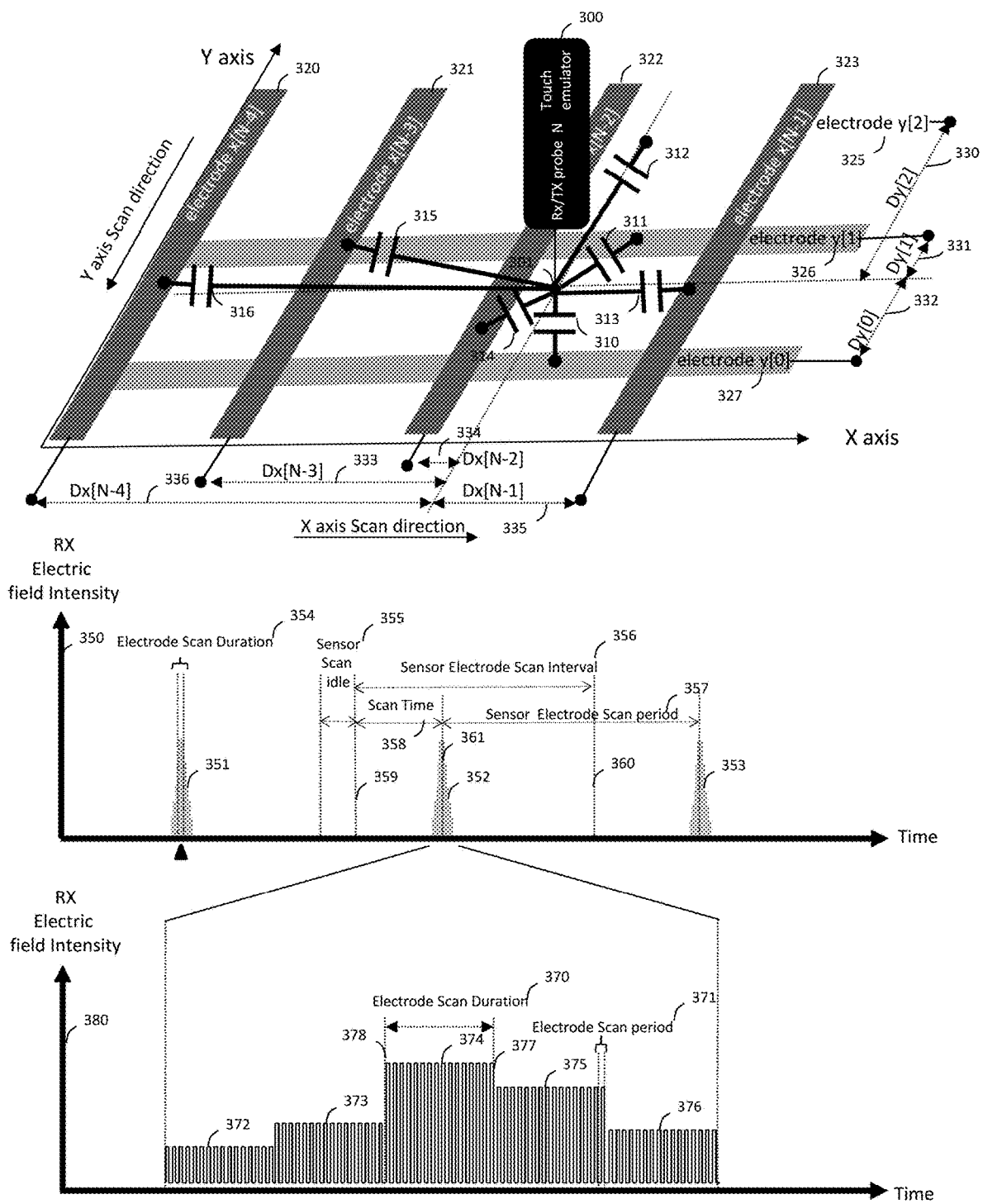
Figure 4. Determining Scan Sequence, schedule and location Using interpolation

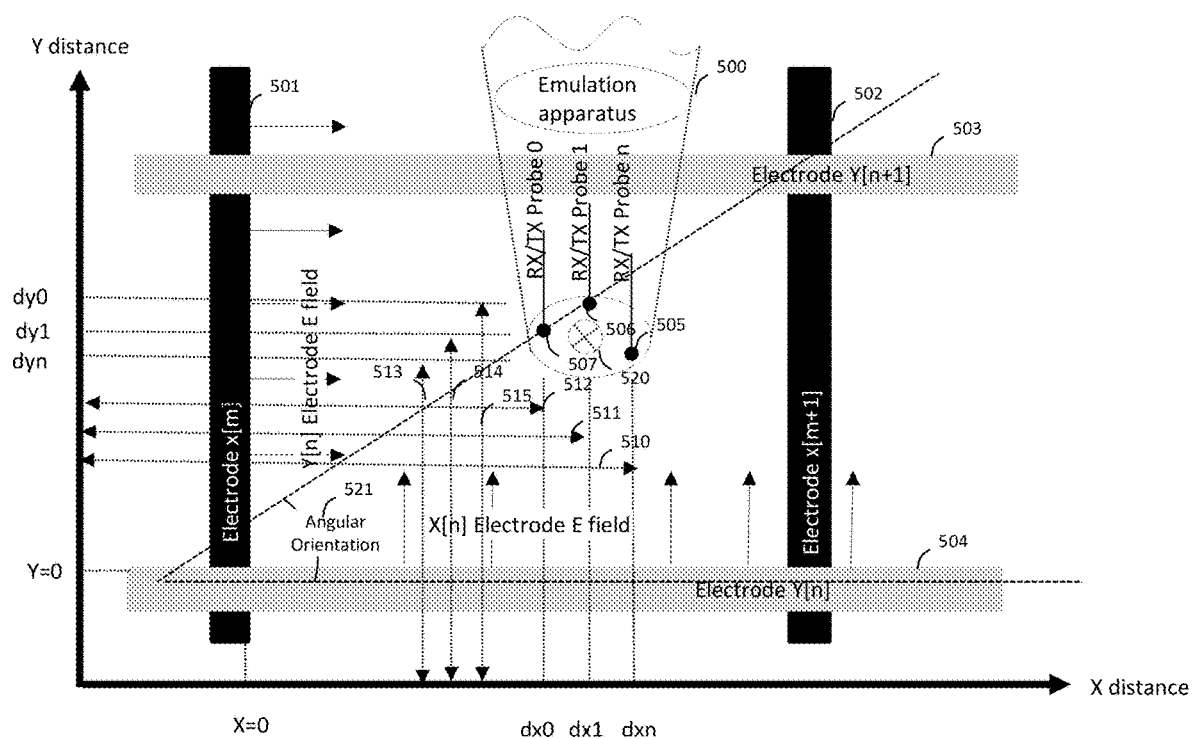
Figure 5. Determining Angular Orientation

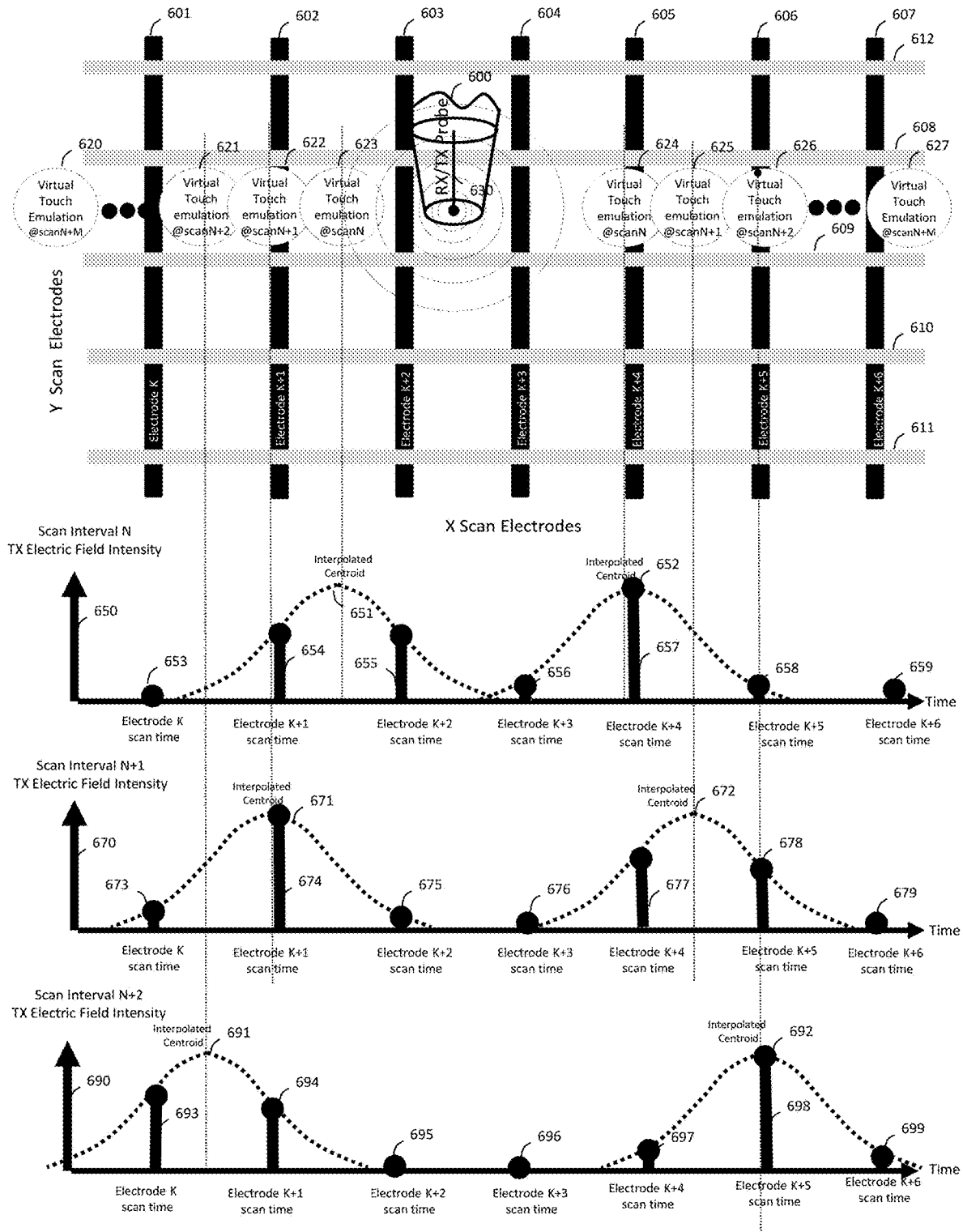
Figure 6. Gesture Emulation Example

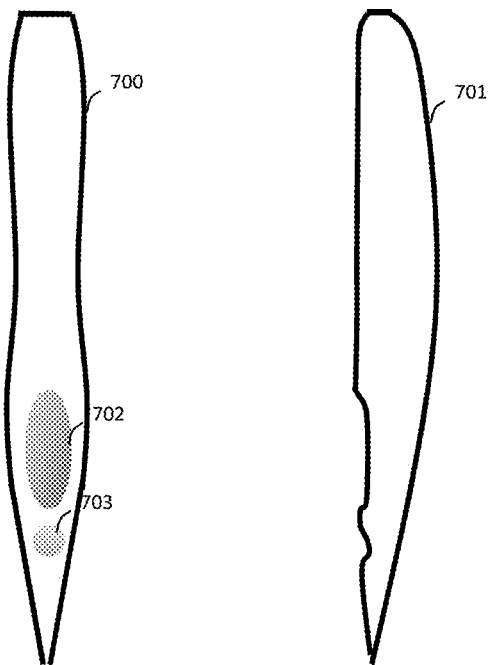
Figure 7. Digitizing Stylus preferred embodiment

METHOD AND APPARATUS FOR EMULATING TOUCH AND GESTURE EVENTS ON A CAPACITIVE TOUCH SENSOR

BACKGROUND OF THE INVENTION

The present invention relates to capacitive touch sensors and more particularly to a method and apparatus to produce electric and magnetic fields to emulate single touch, multiple touch and touch gestures on a capacitive touch sensors providing improved accuracy, sensitivity and enhanced capabilities.

Capacitive touch sensor technology has been integrated into many products and enables capacitive touch pads and capacitive touch screens to sense finger location and finger gesture movement. In addition, capacitive touch sensor technology can also sense and track multiple finger movement gestures commonly referred to as multi-touch. Furthermore, capacitive switches can also detect touch events. Many passive devices such as capacitive styluses have been created for use with capacitive touch sense technology which emulate a finger touch and allow users to perform hand writing in addition to other functions including joystick controllers. Heretofore, passive devices function by capacitively coupling to nearby scan electrodes of the capacitive touch sensor modifying the electric field which is radiated from the scan electrodes such that the self capacitance of the affected electrodes and mutual capacitance between affected electrodes is modified and detected by the electrode capacitive sensor circuitry. Heretofore, for contemporary capacitive touch screens which employ mutual capacitance technology to reliably detect passive devices it has been necessary for passive devices to have a tip geometry on the order of a human finger tip. Additionally, heretofore such devices are limited to being in contact with the capacitive touch screen to be detectable. In addition to passive devices, active devices which emit an electric or magnetic field have been postulated or developed which produce either a magnetic field or an electric field which is detected by the capacitive touch screen circuitry and enable a much smaller tip. Heretofore, active devices which rely on magnetic fields operate on the principle of inducing electric currents in the conductors in a capactive touch screen which are then detected by the capacitive touch screen circuitry. However, magnetic fields suffer from non-uniform directionality and therefore limited accuracy and may not be effective or compatible with all capacitive touch screens. In addition, active devices have been developed which rely on creating electric fields which are detected by the capacitive touch screen circuitry. However, heretofore, active electric field devices require a wire connection to the ground reference of the capacitive touch screen to establish a common reference. This results in a physically intrusive ground reference wire connecting the active electric field device to the capacitive touch screen circuitry.

It is an object of the present invention to provide a method to emulate touch events on a capacitive touch sensor. It is yet another object of the present invention to provide a method to emulate multiple touch events on a capacitive touch sensor array. It is yet another object of the present invention to provide a method to emulate single and multiple touch gestures on a capacitive touch sensor array.

It is an additional object of the present invention to provide a device which emulates touch events on a capacitive touch sensor, which has a means to monitor electric field emissions from scan electrodes of a capacitive touch sensor, and has a means to amplify the monitored electric field emissions and a means to capacitively couple the amplified electric field to the scan electrodes of the capacitive touch sensor emulating a touch event.

It is an additional object of the present invention to provide a method for emulating single-touch events on a capacitive touch sensor array consisting of the steps of monitoring the electric field emissions from scan electrodes in a region of the capacitive touch sensor array; amplifying the monitored electric field emissions and coupling the amplified electric field to the capacitive touch sensor array scan electrodes inducing a voltage which emulates the presence of a touch event in the region.

It is an additional object of the present invention to provide a method for emulating touch events at a plurality of locations on a capacitive touch sensor array consisting of the steps of monitoring the electric field emissions from scan electrodes of the capacitive touch sensor array, predicting the electric field emissions at the plurality of touch locations of the capacitive touch sensor array from the monitored electric field emissions, synthesizing a plurality of electric fields which are coherent and proportional to the predicted electric field emissions and coupling the plurality of synthesized electric fields to the capacitive touch sensor array scan electrodes inducing voltages which emulate the presence of the touch events at the plurality of locations.

It is an additional object of the present invention to provide a method for emulating multiple-touch gesture movements on a capacitive touch sensor array consisting of the steps of monitoring the electric field emissions from scan electrodes of the capacitive touch sensor array, predicting the electric field emissions from electrodes at a plurality of locations spanning the gesture movement from the monitored electric field emissions, generating a sequence of emulated touch events at time varying-locations spanning the gesture movement by synthesizing electric fields which are coincident to the scan time of each electrode at the location of emulated touch event and is also coherent and phase aligned to the scan frequency of the electrode, and coupling the plurality of synthesized electric fields to the capacitive sensor array electrodes inducing voltages which emulate touch events such that the sequence of emulated touch events animates a gesture movement.

It is an additional object of the present invention to provide a device for emulating single-touch events on a capacitive touch sensor array which has a means to monitor the electric field emissions from a plurality of scan electrodes at a location of the capacitive touch sensor array, an electric field synthesizing means to synthesize an electric field that is coherent and proportional to the monitored electric field emissions and a coupling means to couple the synthesized electric field to the capacitive touch sensor array scan electrodes inducing voltages which emulate the presence of a touch event at the location.

It is an additional object of the present invention to provide a device for emulating touch events at a plurality of locations on a capacitive touch sensor array which includes a means to monitor the electric field emissions from scan electrodes of the capacitive touch sensor array, a predicting means to predict the electric field emissions at the plurality of touch locations of the capacitive touch sensor array from the monitored electric field emissions, a synthesizing means to synthesize a plurality of electric fields which are coherent and proportional to the predicted electric field emissions and a coupling means to couple the plurality of synthesized electric fields to the capacitive touch sensor array scan electrodes inducing voltages which emulate presence of the touch events at the plurality of locations.

It is an additional object of the present invention to provide a device for emulating multiple-touch gesture movements on a capacitive touch sensor array including a monitoring means to monitor the electric field emissions from scan electrodes of the capacitive touch sensor array, a predicting means to predict the electric field emissions from electrodes at a plurality of locations spanning the gesture movement from the monitored electric field emissions, a generating means to generate a sequence of emulated touch events at time varying-locations spanning the gesture movement by synthesizing electric fields which are coincident to the scan time of each electrode at the location of emulated touch event and is also coherent and phase aligned to the scan frequency of the electrode, and a coupling means to couple the plurality of synthesized electric fields to the capacitive sensor array electrodes inducing voltages which emulate touch events such that the sequence of emulated touch events animates a gesture movement.

It is yet a more specific object of the present invention to provide an active capacitance stylus device which emulates multi-touch finger gestures and has a fine tip.

It is a more specific object of the present invention to provide an apparatus which emulates multiple touch finger gestures on a capacitive touch screen.

It is yet another object of the present invention to provide a method to determine the angular orientation of a capacitive touch sensor array relative to a reference by monitoring the emitted electric fields from the scan electrodes of the capacitive touch sensor array.

It is yet another object of the present invention to provide a device to determine the orientation, horizontal and vertical position, direction of movement, velocity, and pressure of the apparatus on a capacitive touch sensor array by monitoring the electric fields emitted from the scan electrodes of the capacitive touch sensor array.

It is yet another object of the present invention to provide a device which produces electric and magnetic fields to emulate multi-touch finger gestures on a capacitive touch screen.

It is yet another object of the present invention to provide a device which modulates emulated touch events to enable communicating data to a capacitive touch sensor array.

It is yet another object of the present invention to provide a device which modulates emulated touch events to enable rejecting non emulated touch events to a capacitive touch sensor array.

SUMMARY OF INVENTION

It is a general object of the present invention to provide a method for emulating touch events on a capacitive touch sensor. It is an additional object of the present invention to provide a method for emulating multiple touch events on a capacitive touch sensor array. It is yet another object of the present invention to provide a method for emulating multiple touch gesture events on a capacitive touch sensor array. It is a more specific object of the present invention to provide a touch and gesture emulation apparatus which has a first coupling means to detect the electric fields emitted from electrodes of a capacitive touch sensor and a predictive means to determine the electrode scan time and scan signals of the capacitive touch sensor from the detected electric fields, and has a synthesizer means to synthesize electric fields which are coincident and coherent to the predicted electrode scan time and scan signals and a second coupling means which couples the synthesized electric fields to the scan electrodes of the capacitive touch sensor inducing signals which emulate single touch, multi-touch events and gesture events.

It is a yet another object of the present invention to provide a method to emulate touch events at a location on a capacitive touch sensor consisting of the steps of: measuring the electric field intensities emitted from a plurality of scan electrodes at the location on the capacitive touch sensor, synthesizing electric fields that are coherent and proportional to the measured electric fields, and the further step of coupling the synthesized electric fields to the capacitive touch sensor scan electrodes inducing voltages which emulates the presence of a touch event at the location.

It is an additional object of the present invention to provide a method for emulating touch events at a plurality of locations on a capacitive touch sensor array consisting of the steps of: measuring the electric field intensities emitted from a plurality of scan electrodes of the capacitive touch sensor array, predicting the electric field intensity emitted from electrodes at the plurality of touch locations of the capacitive touch sensor array from the measured electric field intensities, synthesizing a plurality of electric fields which are coherent and proportional to the predicted electric fields emitted from the electrodes at the plurality of touch emulation locations and coupling the plurality of synthesized electric fields to the capacitive touch sensor array scan electrodes inducing voltages which emulate presence of the touch events at the plurality of locations.

It is an additional object of the present invention to provide a method for emulating multiple-touch gesture movements on a capacitive touch sensor array which consists of the steps of: measuring the electric field intensities emitted from a plurality of scan electrodes of the capacitive touch sensor array, predicting the scan time, scan frequency and scan amplitude of the scan electrodes at a plurality of locations spanning the gesture movement from the measured electric fields, generating a sequence of emulated touch events at time varying locations spanning the gesture movement by synthesizing electric fields which are coincident to the scan time of each electrode at the location of the emulated touch event and are also coherent and phase aligned to the scan frequency of the electrode, coupling the synthesized electric fields to the capacitive sensor array electrodes inducing voltages which emulate touch events such that the sequence of emulated touch events animates a gesture movement.

It is a yet another object of the present invention to provide an apparatus to emulate touch events at a location on a capacitive touch sensor which incorporates a detection means to measure electric field intensities emitted from a plurality of scan electrodes at the location on the capacitive touch sensor and also incorporates an electric field synthesizer means to synthesize electric fields that are coherent and proportional to the measured electric fields, and further incorporates a coupling means to couple the synthesized electric fields to the capacitive touch sensor scan electrodes inducing voltages which emulates the presence of a touch event at the location.

It is an additional object of the present invention to provide an apparatus for emulating touch events at a plurality of locations on a capacitive touch sensor array which incorporates a detection means to measure the electric field intensities emitted from a plurality of scan electrodes of the capacitive touch sensor array, a predicting means to predict the electric field intensity emitted from electrodes at the plurality of touch locations of the capacitive touch sensor array from the measured electric field intensities, a synthesizing means to synthesize a plurality of electric fields which are coherent and proportional to the predicted electric fields emitted from the electrodes at the plurality of touch emulation locations and a coupling means to couple the plurality of synthesized electric fields to the capacitive touch sensor array scan electrodes inducing voltages which emulate presence of the touch events at the plurality of locations.

It is an additional object of the present invention to provide an apparatus for emulating multiple-touch gesture movements on a capacitive touch sensor array which incorporates a detection means to measure the electric field intensities emitted from a plurality of scan electrodes of the capacitive touch sensor array, a predicting means to predict the scan time, scan frequency and scan amplitude of the scan electrodes at a plurality of locations spanning the gesture movement from the measured electric fields, a generating means to generate a sequence of emulated touch events at time varying-locations spanning the gesture movement by synthesizing electric fields which are coincident to the scan time of each electrode at the location of the emulated touch event and are also coherent and phase aligned to the scan frequency of the electrode, and also incorporates a coupling means to couple the synthesized electric fields to the capacitive sensor array electrodes inducing voltages which emulate touch events such that the sequence of emulated touch events animates a gesture movement.

It is yet another object of the present invention to provide a touch and gesture emulation apparatus that has a means to monitor electric field emissions from scan electrodes of a capacitive touch sensor array and has a means to determine the location of the apparatus relative to the location of the scan electrodes of the capacitive touch sensor array from the monitored electric field emissions.

It is yet another object of the present invention to provide a touch and gesture emulation apparatus that has a means to monitor electric field emissions from scan electrodes of a capacitive touch sensor and has a means to determine the rotational orientation of the apparatus relative to the scan electrodes of the capacitive touch sensor.

It is yet another object of the present invention to provide a touch and gesture emulation apparatus that has a means to monitor electric field emissions from scan electrodes of a capacitive touch sensor array and has a means to determine height of the apparatus relative to the scan electrodes of the capacitive touch sensor array.

It is yet another object of the present invention to provide a touch and gesture emulation apparatus which has a means to monitor electric field emissions from scan electrodes of a capacitive touch sensor array and has a means to synthesize electric fields which are coherent to the monitored electric field emissions and a further means to amplitude shift key modulate synthesized electric fields to induce a signal in the electrodes of the capacitive touch sensor array emulating a touch event which represent data.

It is yet another object of the present invention to provide a touch emulation apparatus which incorporates a modulator means to amplitude shift key modulate emulated touch events to enable communicating position, height, angular orientation, movement, pressure, button presses, and slider data to a capacitive touch sensor.

It is yet another object of the present invention to provide a touch emulation apparatus which communicates data to a capacitive touch sensor which incorporates a modulator means to amplitude shift key modulate emulated touch events to enable communicating apparatus position, height, angular orientation, movement, tip pressure, button presses, and slider data to a capacitive touch sensor.

It is yet another object of the present invention to provide a touch emulation apparatus which incorporates a means to amplitude shift key modulate emulated touch events to enable a capacitive touch sensor array to reject non emulated touch events.

It is yet another object of the present invention to present a touch emulation apparatus that can communicate binary data including position, orientation, tip pressure, button presses, slider movements and movement on a capacitive touch sensor array consisting of a first coupling means for detecting electric field intensities as a function of time which are emitted from a plurality of scan electrodes in the capacitive touch sensor, and further includes a synthesizer means to generate electric fields which are coherent to the detected electric fields and further includes a modulator means to amplitude shift key modulate the synthesized electric fields, and further includes a second coupling means to couple the amplitude shift key modulated electric field to the capacitive touch sensor inducing voltages in a plurality of scan electrodes proportional to binary data.

It is yet another object of the present invention to provide a touch emulation apparatus to determine the relative rotational orientation of the apparatus to a scan electrode in a capacitive touch sensor array.

It is yet another object of the present invention to provide a digitizing stylus apparatus that is compatible with capacitive touch screen devices that emulates a finger touch.

It is yet another object of the present invention to provide a digitizing stylus apparatus that is compatible with capacitive touch sensor arrays and derives location, and movement by detecting the electric fields emitted from the scan electrodes of the capacitive touch sensor array as a function of time.

It is yet another object of the present invention to provide a digitizing stylus apparatus with a button to enable or disable the stylus from emulating a finger touch event.

It is yet another object of the present invention to provide a digitizing stylus apparatus with a slider which emulates two finger gestures on the capacitive screen when activated.

It is yet another object of the present invention to provide a digitizing stylus apparatus that emulates touch events on a capacitive touch screen and also provides palm rejection.

The present invention provides an innovational design which incorporates state of the art capacitive touch sensor signal processing technology to provide precise action, increased accuracy, lower cost, and added functionality over known existing products.

In a preferred embodiment, the capacitive touch and gesture emulation apparatus incorporates a detection means to measure electric field intensities emitted from a plurality of scan electrodes at a location on a capacitive touch sensor and also incorporates an electric field synthesis means to synthesize electric fields that are coherent and proportional to the measured electric fields, and further incorporates a capacitive coupling means to couple the synthesized electric fields to the plurality of scan electrodes of the capacitive touch sensor inducing voltages which emulates the presence of a touch event at the location.

In yet another preferred embodiment, the capacitive touch and gesture emulation apparatus includes a detection means to measure the scan time and scan waveform of a plurality of scan electrodes from the electric field intensities emitted from the plurality of scan electrodes of a capacitive touch sensor array, a predicting means to predict the scan time and scan waveform of the scan electrodes at a plurality of touch locations of the capacitive touch sensor array from the measured electric field intensities, a synthesizing means to synthesize a plurality of electric fields which are coincident to the predicted scan time and coherent and proportional to the predicted scan waveform of the electrodes at the plurality of touch emulation locations and a coupling means to couple the plurality of synthesized electric fields to the capacitive touch sensor array scan electrodes inducing voltages which emulate presence of the touch events at the plurality of locations.

In yet another preferred embodiment, the capacitive touch and gesture emulation apparatus includes a detection means to measure the electric field intensities emitted from a plurality of scan electrodes of the capacitive touch sensor array, a predicting means to predict the scan time and scan waveform of the scan electrodes at a plurality of locations spanning the gesture movement from the measured electric fields, a generating means to generate a sequence of emulated touch events at time varying-locations spanning the gesture movement by synthesizing electric fields which are coincident to the scan time of each electrode at the location of the emulated touch event and are also coherent and phase aligned to the scan waveform of the electrode, and also incorporates a coupling means to couple the synthesized electric fields to the capacitive sensor array electrodes inducing voltages which emulate touch events such that the sequence of emulated touch events animates a gesture movement.

In yet another preferred embodiment the capacitive touch and gesture emulation apparatus is a stylus.

In yet another preferred embodiment the capacitive touch and gesture emulation apparatus is a glove with each finger incorporating an independent touch and gesture emulation apparatus.

In yet another preferred embodiment the capacitive touch and gesture emulation apparatus is a game controller.

Further objects and advantages of the present invention will become apparent to those skilled in the art from a consideration of the following detailed description of the preferred embodiment and drawings.

DESCRIPTION OF DRAWINGS

FIG. 1 Block diagram of capacitive touch and gesture emulation apparatus

FIG. 2 Diagram of capacitive touch screen

FIG. 3 Diagram showing touch emulation

FIG. 4 Diagram showing scan sequence, scan time, and scan schedule

FIG. 5 Diagram showing angular orientation determination

FIG. 6 Diagram showing gesture emulation

FIG. 7 Example diagram of touch emulation stylus

DETAILED DESCRIPTION

Many products incorporate capacitive touch sensor array technology which enables two dimensional finger touch and gesture interaction. Three dimensional gesture interaction, commonly referred to as hover, is also supported by many devices. Capacitive sensor array technology can provide electronic devices with an easy to use, robust, and feature rich user touch interface. Devices which commonly utilize capacitive sensor array technology include smartphones, tablets, cameras and computer keyboard touch pads.

The touch emulation apparatus preferably receives electric fields emitted from electrodes of a capacitive sensor array and preferably generates coherent electric fields which interact with the capacitive sensor array electrodes to emulate a touch event. Additionally, from the received electric fields the apparatus preferably determines the scan sequence and schedule for the electrodes of the capacitive sensor array and determines the two and three dimensional coordinates of the apparatus relative to the capacitive touch sensor array. Preferably utilizing the scan sequence and received electric fields the apparatus preferably creates multiple coherent electric fields per scan interval as a function of time to emulate multi-touch events and gestures. Additionally, the apparatus also preferably determines rotational orientation relative to the electrodes of the capacitive touch sensor array and also can preferably detect movement velocity. The apparatus can preferably also modulate the generated coherent electric fields to communicate data preferably including position, speed, orientation and hover height to the capacitive touch sensor array. The apparatus preferably also contains button and slider controls which enable a user to control the single and multi-touch events and gestures. Additionally, the touch emulation apparatus can also function with capacitive sensors to emulate button presses.

A preferred block diagram of the touch emulation apparatus is shown in FIG. 1. As can be seen, the apparatus 1, preferably consists of an application processor 28, user control 31, Universal Serial Bus (USB) interface 32, receive signal processor 11, emulation processor 33, electric field synthesizer 44, electric field modulator 45, electric field detector 4, and plurality of receive probes 50, 51, 52 and transmit probe 47. FIG. 2 presents background concepts of capacitive sense array technology that will provide a foundation Additionally, FIG. 3 presents the concepts of emulating touch events on a capacitive sense array FIG. 4 presents the concepts of determining scan sequence and scan schedule from the capacitive sensor array and also determining the coordinates of the apparatus relative to the capacitive sensor array. FIG. 5 presents the methods used to determine the orientation of the apparatus relative to the capacitive sensor array. Lastly, FIG. 6 presents the concepts of multi-touch and gesture emulation. FIG. 7 presents a preferred embodiment of the touch emulation apparatus. Each figure will be referenced appropriately when presenting the relevant subsystems of the touch emulation apparatus 1.

FIG. 2 presents the foundation principles of capacitive sensor array operation. A capacitive sensor array 100 is typically constructed with an array of perpendicular electrodes. As can be seen in FIG. 2, the capacitive sensor array 100, has M horizontal electrodes 106, 107, 108, 109 and N perpendicular electrodes 101, 102, 103, 104, 105. Typically N and M are range between 4 and 128. Electrodes 113 and 114 are shown in detail and are a subset of the array of electrodes to enable enhanced detail in the diagram. The perpendicular electrodes are separated by an insulator and each electrode has an associated driver 115, 121 and capacitance sensor 117, 123.

Two basic types of capacitive sensor technology are common—self capacitance and mutual capacitance. Sensors employing self capacitance measure the capacitance of electrodes 113, 114 represented as capacitors 119 and 118 respectively, and are typically limited to sensing single touch and hover events, while sensors employing mutual capacitance measure the capacitance between perpendicular electrodes 113, 114 and is represented as capacitor 120 and are capable of sensing multi-touch events but do not typically have the sensitivity to detect hover events. In self capacitance sensors, the electrode driving circuits 115, 121 produce an electrode charge current and the associated capacitance of the electrode 118, 119 is measured by the associated capacitive sense module 117, 123 which can use a number of industry standard methods to sense the capacitance including relaxation oscillation, charge time vs. voltage, voltage divider, charge transfer and sigma delta modulation. In mutual capacitance sensors, the electrode driving circuit 115 produces an electrode 114 charge current which couples to electrode 113 and the mutual capacitance 120 is measured by the capacitive sense module 123. When a grounded conductive object such as a finger 111 is in close proximity to an electrode 113 of the capacitive sensor array 100, the additional capacitance 112 is introduced in parallel with the mutual capacitance 120 and self capacitance 118, 119. The change in mutual capacitance is measured by a capacitive sense module 123 and the change in self capacitance is measured by a capacitive sense modules 117 and 123.

The touch emulation apparatus 1 preferably incorporates a plurality of receive probes 50, 51, and 52 which capacitively couple to electrodes in a capacitive sensor array to receive electric field emissions from the electrodes. The number of probes 50-52 preferably ranges between 1 and 5; however, greater numbers are feasible. The electric field emissions received by probes 50-52 are applied to Receive Signal Detectors 5, 7, 9 respectively and analog to digital converters 6, 8, 10 respectively which amplify the analog signals and then convert them to digital form. The outputs from the analog to digital converters 60, 61, 62 are applied to the receive signal processor 11.

The receive signal processor 11 uses the digital converter outputs 60, 61, 62 and preferably the predetermined capacitive touch sensor array electrode locations 18 to determine the scan schedule 21, scan sequence 22, scan frequency 23 of the capacitive sensor array in addition to the apparatus XY position 26, hover position 27, orientation 24, and apparatus movement 25. The receive signal processor 11 is preferably composed of a mutual capacitance processor 12, a predictive scan pattern processor 13, 2D-XY coordinate interpolator 15, 3D-Z Hover coordinate interpolator 17, orientation processor 16, and a movement processor 14.

Mutual Capacitance Processor 12

The mutual capacitance processor 12, determines the relative distance between receive probes 50-52 of the touch emulation apparatus 1 and the electrodes 101-109 of the capacitive sensor array 100. FIG. 4 presents a schematic diagram showing the electrodes 320-323, 325-327 corresponding to a set of electrodes 101-109 of capacitive touch sensor 100, a representative touch emulation apparatus 300 which corresponds to apparatus 1 with receive probe 301 which corresponds to one of the receive probes 50-52, and plurality of capacitive couplings:

310 to electrode y[0] 327 over distance dy[0] 332
311 to electrode y[1] 326 over distance dy[1] 331
312 to electrode y[2] 325 over distance dy[2] 330
313 to electrode x[N−1] 323 over distance dx[N−1] 335
314 to electrode x[N−2] 322 over distance dx[N−2] 334
315 to electrode x[N−3] 321 over distance dx[N−3] 333
316 to electrode x[N−4] 320 over distance dx[N−4] 336

The number of electrodes capacitvely coupling to the receive probe 301 is preferably less than 32 but not limited to 32.

The approximate value of the capacitance between the receive probe 301 and each of the plurality of electrodes 320-323, 325-327 is shown in equation 1:

Equation 1: Relationship of capacitance to distance between electrodes 320-323, 325-327 and receive probe 301.

$$C_n \approx 4\Pi\varepsilon_0 L(1/\ln((L+\sqrt{L^2+D_n^2})/D_n)) \quad \text{Equation 1.}$$

Where: L—Length of the electrode 320-323, 325-327 (constant)

Dn—distance of receive probe 50-52, 301, from electrode n 330-336

$\varepsilon_0$—permeativity of free space (constant)

Equation 2, approximately relates the voltage at the receive probe 301 from each of the plurality of electrodes 320-323, 325-327.

$$RX\ Vprobe_n \approx \omega RC_n/\sqrt{1+\omega^2 R^2 C_n^2} \quad \text{Equation 2.}$$

Where: $\omega$—electrode 320-323, 325-327 scan frequency 1/371

R—real load resistance of receive probe 301 (constant)

Cn—Capacitance between receive probe 301 and electrode n 320-323, 325-327 given by eqn. 1.

Vproben—received digitized signals—60-62.

For each electrode the mutual capacitance processor 12 preferably uses the received digitized signals 60-62 to solve the system of equations comprised of Equation 1 and Equation 2 to determine relative distances 330-336 Dn between electrodes 320-323, 325-327 and the receive probes 50-52 and provides the computed array of distances 330-336 Dn to the predictive scan pattern processor 13 on output-68 and to the 2D X-Y Coordinate Interpolator 15 on output 69.

Predictive Scan Pattern Processor 13

The predictive scan pattern processor 13 preferably accepts the estimated distances 68 between the receive probes 50-52, 301 of the touch emulation apparatus 1 and the electrodes of the capacitive sensor array 320-323, 325-327 computed by the mutual capacitance processor 12, the digitized signals 60-62, and the predetermined capacitive sensor array electrode locations database 18 on interface 65 to produce an estimate of capacitance sensor array 100 electrode scan waveform which includes the scan duration 20, scan schedule 21, scan sequence 22, and scan frequency 23. The scan schedule 21 is preferably the specific scan times 358 that the capacitive sensor array 100 will scan each electrode 320-323, 325-327. The scan sequence 22 is preferably the order in which the capacitive sensor array 100 will scan each electrode 320-323, 325-327. The scan frequency 23 is preferably the frequency 1/371 of signal 130, 131 which the associated transmit electrode driver 115, 121 stimulates the electrodes 320-323, 325-327 of the capacitive sensor array 100. FIG. 4 shows a preferred scan sequence 350 utilized by many capacitive scan sensor array implementations; however, many different scan sequences could be utilized by the capacitive sensor array 100 and can also change as a function of time and in response to touch events but should still be considered within the spirit of the current invention. The preferred scan sequence 350, graphs magnitude of the electric field received by probe 301 verses time. Each scan sequence 350 is separated into a sensor electrode scan interval 356 during which the electrodes 320-323, 325-327 of the capacitive touch sensor 100 are being stimulated by the associated transmit electrode driver 115, 121 and monitored by the associated electrode capacitive sense module 117, 123, and a sensor scan idle 355 during which no electrodes are being stimulated. The sensor scan idle 355 is typically extended for low power operations and shortened when touch events are active. The sensor electrode scan period 357 is the total time between each scan of the same electrode one of 320-323,325-327. The scan time 358, is the time from the beginning of the sensor scan interval 359 to the time an electrode 320-323, 325-327 is scanned. Waveform 380 displays an example waveform of the magnitude of the electric field 372, 373, 374, 375, 376 received by probe 301 verses time for the time interval surrounding the sequence of scans of electrodes 320-323 respectively of the capacitive sensor array 100. The electrode scan duration 20, 354, 370 is preferably the time from-the beginning of an electrode scan 378 to the end of an electrode scan 377. The amplitudes 372-375 of the received electric field by probe 301 verses time preferably reflect the relative distance of the electrode 320-323—respectively, from the touch emulation probe 301. Preferably the predictive scan pattern processor 13 computes equations 3, equation 4, equation 5, equation 6 for each electrode [n] 320-323, 325-327 of the capacitive sensor array 100 and provides the results.

Electrode scan duration[$n$]354,370=electrode start scan time[$n$]378−electrode end scan time[$n$]377  Equation 3.

Electrode scan frequency[$n$]1/371=frequency of electric field 375  Equation 4.

Electrode scan interval[$n$]356=scan interval start time[$n$]359−scan interval end time[$n$]360  Equation 5.

Electrode scan time[$n$]358  Equation 6.

2D X-Y Coordinate Interpolator 15

The 2D X-Y coordinate interpolator 15 preferably accepts the measured distances 330-336 Dn 69, between the receive probe 301 and each electrode 320-323, 325-327 and the electrode scan time[n] 358 for each electrode 320-323, 325-327 and also accepts the predetermined capacitive sensor array electrode locations 66 from 18 and computes the 2 dimensional location coordinates 70, 63, 67, 26 of the touch emulation apparatus 1 relative to the electrode locations 66 of the capacitive sensor array 100.

Movement Processor 14

The movement processor 14, preferably differentiates the 2D coordinates 70 from the 2D X-Y coordinate interpolator 15 as a function of time and determines the movement of the touch emulation apparatus 1 and provides the results on 25 as a vector with direction of movement and magnitude of velocity. Equation 7 summarizes the calculation that is performed by the movement processor 14.

movement($t$)=$d$($x$−$y$ coordinates($t$))/$dt$  Equation 7.

3D Z-Hover Coordinate Interpolator

The 3D Z-Hover coordinate interpolator 17 preferably determines the height of the touch emulation apparatus 1 above the capacitive sensor array 100. Preferably the Z-Hover coordinate interpolator 17 estimates the height based on the power level of the received signal 60-62 coupled to the touch emulation receive probe 50-52, 301 from electrodes of the capacitive sensor array 320-323, 325-327. In particular, triangulation can preferably be used to determine the height. Preferably the 2D X-Y coordinate interpolator 15 determines the X-Y coordinates 67 of a receive probe 50-52, 301 and equation 1 is used to measure the distance from an electrode 320-323-325-327 to the receive probe 50-52, 301. Equation 8 is then preferably solved to yield the height H above the capacitive sensor array 100.

$H_n^2 = D^2 - D_n^2$  Equation 8.

Where: D—the value of distance between the an electrode (one of 320-323, 325-327) and a touch emulator apparatus probe 50-52, 301, preferably solved from equation 1 and equation 2 for electrode n.

Dn—2D distance between electrode n and the capacitive touch emulator

Hn—height 27 above electrode (n) (one of 320-323, 325-237)

Orientation Processor

The orientation processor 16 preferably determines the rotational orientation 24 of the touch emulation apparatus 1 relative to electrodes 101-109 in the capacitive sensor array 100. Referring to FIG. 1 and FIG. 5, the orientation processor 16 preferably determines the angle 521 between the axis 520 of the touch emulation apparatus 500 and an electrode 504 of the capacitive touch sensor array 100. The orientation processor 16 preferably computes the orientation 24 by measuring the relative capacitive coupling between a plurality of electrodes 501, 502, 503, 504 and a plurality of receive probes 505-507 of the capacitive touch emulation apparatus 500 which corresponds to the touch emulation apparatus 1, and calculating the relative distances of each receive probe 510-515 from the electrodes 501-504 preferably using equation 1 and equation 2. The 2D X-Y coordinate interpolator 15 preferably determines the coordinates 63 of each probe 505-507 relative to the electrodes 501-504 in the form:

Location of probe 0 507 (X0, Y0)
Location of probe 1 506 (X1, Y1)
Location of probe n 505 (Xn, Yn)

The angular orientation 24 of the touch emulation apparatus 500 is preferably determined as:

$$\phi = \tan^{-1}\left(\frac{Y1 - Y0}{X1 - X0}\right).$$  Equation 9

Where:

ϕ=angle 521 between the capacitive touch emulation apparatus 500 and electrode 501-504 of the capacitive sensor array electrode 100.

X0—distance 512 from electrode 501 and probe 507
Y0—distance 514 from electrode 504 and probe 507
X1—distance 511 from electrode 501 and probe 506
Y1—distance 513 from electrode 504 and probe 506

Other similar mathematical methods exist to compute the angular orientation 24 of touch emulation apparatus 500 relative to electrodes 501-504 utilizing electric fields emitted from the capacitive touch sensor array 100 and should be considered within the spirit of the invention. The properties extracted from the received signals 60-62 by the receive signal processor 11 preferably include the electrode scan duration 20, scan schedule 21, scan sequence 22, scan frequency 23 which define the electrode scan waveforms 130, 131, and the angular orientation 24, movement 25, X-Y position 26, and the hover position 27. The Application processor 28 executes a program which processes user control 29 inputs, preferably including button presses and slider movements on the capacitive touch emulation apparatus 1 and also processes the properties extracted from the receive signal processor 20-27 and generates control outputs to the emulation processor 33, electric field synthesizer 44, and electric field modulator 45. Additionally, the application processor 28 preferably interfaces to a universal serial bus interface 32 which enables the application processor 28 to receive program updates, user configuration changes including touch and gesture emulation actions taken in response to user control 29 actions preferably including slider movements and button presses.

The application processor 28 can preferably trigger the generation of single touch emulation events, multi-touch emulation events, and gesture emulation events. Single touch emulation events are the foundation which multi-touch emulation events and single and multi-touch gesture emulation events are based on. Multi-touch emulation events are preferably multiple single touch events created during the same scan interval 356 but generated at unique time instances corresponding to when the desired plurality of multi-touch locations of electrodes are being actively scanned during the scan interval 356 of the capacitive sensor array 100. The plurality of multiple touch events emulated preferably ranges between 2 and 5 but could be larger. Additionally, single touch gesture emulation events are preferably single touch emulation events that are animated at time variant instances corresponding to when the desired location of electrodes is being actively scanned during the scan interval 356 of the capacitive sensor array 100 emulating a single touch gesture. Additionally, multi-touch gesture emulation events are preferably multi-touch emulation events that are animated at time variant instances corresponding to when the desired plurality of locations of electrodes is being actively scanned during the scan interval 356 of the capacitive sensor array 100 emulating a multi-touch gesture.

The application processor 28 initiates a single touch event by preferably requesting the emulation processor 33 to create an emulated touch event. The emulation processor 33 preferably receives the electrode scan schedule 21, on signal 36 for the capacitive sensor array 100 which specifies the scan time 358 of each electrode 320-323, 325-327 and also receives the two dimensional coordinates specifying the location 37 to generate the touch event. The emulation processor 33 is preferably further comprised of a transmit electric field intensity interpolator 35 and a touch emulation trigger 34. The transmit electric field intensity interpolator 35 preferably computes the relative electric field intensities 43 to be produced for each electrode scan duration 370 to result in an emulated touch event at a plurality of electrodes that will have a centroid at the two dimensional location 37. Preferably the electric field intensity interpolator 35 computes the intensity 43 in accordance with equation 10:

$$TXVprobe_n \approx A\cos\left(\frac{\pi}{2} \frac{D_n}{Delectrod_n}\right). \quad \text{Equation 10}$$

TX Vprobn—the amplitude of the voltage at the transmit probe 47
A—scaling factor
Dn—distance between scan electrode and location to emulated touch event
Delectroden—distance between electrodes in capacitive touch screen 100

Other mathematical formals are possible for computing the preferred transmit electric field potential 43; however, the specifics of the various equations would still be considered within the spirit of the invention.

The emulation processor 33, preferably produces the touch emulation trigger 42 when an associated electrode of the capacitive sense array 100 is being scanned. The touch emulation trigger 42 preferably notifies the electric field synthesizer 44 to begin producing an electric field 48 which is coherent and phase edge aligned to the electrode scan signal 130, 131 being produced by the capacitive sensor array 100 electrode driver 115 or 121.

The transmit electric field synthesizer 44 preferably synthesizes an electric field output signal 48 which is preferably a square waveform voltage with an amplitude determined by the electric field intensity 43, a frequency defined by scan frequency input 23 on 40, a phase defined by the scan phase input 38 and a duration defined by the scan duration input 20 on 39. Other waveforms could be synthesized including triangular, sinusoidal or arbitrary waveforms and are still within the spirit of the invention.

The electric field modulator 45 preferably provides a means to modulate the touch and gesture emulation events, encoding data at a plurality of emulated touch locations. The capacitive touch sensor array 100 application processing the touch events can receive the modulated touch events and take action on the data. The electric field modulator 45 receives the electric field signal 48 and a transmit data signal 41 and preferably amplitude shift key modulates the electric field signal 48 to produce the transmit electric field 46 which is applied to the transmit probe 47. Other modulation schemes could be used including frequency modulation, and phase modulation and are within the spirit of the invention. The electric field modulator 45 preferably provides a means to encode transmit data 41 on the transmit electric field 48 such that the capacitive sensor array 100 can receive the transmit data 41 and preferably provide it to an application associated with the capacitive sensor array 100. The application processor 28 preferably provides touch emulation apparatus 1 status information on the transmit data signal 41 which preferably includes the X-Y position 26, movement 25, hover Z position 27, and rotational orientation 24; preferably in addition to user control 29 inputs including button presses and slider movements. Additionally, other sources of transmit data could be encoded such as data from game controllers and is considered within the spirit of the invention and could also be used to enable palm rejection.

The transmit probe 47 preferably capacitively couples to electrodes 320-323, 325-327 of the capacitive sensor array 100 and the transmit electric field 46 produced by the electric field modulator 45 couples to electrodes 320-323, 325-327 of the capacitive sensor array.

Single Touch Emulation

The touch emulation apparatus 200 with a capacitive sense array 201 is shown in FIG. 3, wherein the touch emulation apparatus 200 corresponds to touch emulation apparatus 1, and the capacitive sense array 201 corresponds to the capacitive sense array 100. A representative touch emulation location 227 is shown on the capacitive sense array 201. FIG. 3 further shows the electrodes 206 and 205 in the region of touch emulation 227 of the capacitive sense array 201. Probe 202 corresponds to one of the plurality of receive probes 50-52 of the touch emulation apparatus 1, and forms mutual capacitances 203, 208 with perpendicular electrodes 206, 205 respectively of the capacitive sense array 201.

If the capacitive touch sensor array 201 is operating in self capacitance mode, electrodes 205, 206 are stimulated by electrode drivers 213, 215 respectively. The touch emulation probe 202 preferably couples to the electric field potential produced from electrodes 206 and 205 through mutual capacitances 203, 208 respectively. The electric fields are preferably amplified and digitized by the Electric Field Detector 4, and passed 60-62 to the Receive Signal Processor 11. The Receive signal processor 11, preferably determines the scan duration 20, scan schedule 21, scan sequence 22 and scan frequency 23, for electrodes 218-226 collectively referred to as electrode scan waveforms, and orientation 24, movement 25, XY Position 26, and Hover Position 27. The electrode scan waveforms are preferably passed to the Application Processor 28. The application processor 28 preferably requests the emulation processor 33 to produce a single touch emulation event at the X-Y location 37 and also provides the electrode scan schedule 21 on 36 for the requested touch emulation event 227. Additionally, the application processor 28 preferably requests the electric field synthesizer 44 to produce an electric field for the associated emulated touch event 227 with a scan frequency 23 on 40, scan duration 20 on 39 and a scan phase of 38 which were preferably determined by the receive signal processor 11. The emulation processor 33 triggers 42 the electric field synthesizer 44 to produce an electric field coincident to the electrode scan time 358 and coherent and proportional to the electrode scan waveform for preferably a subset of the scan electrodes 218-226 surrounding the touch emulation point 227. Subsequently, the touch emulation apparatus 200 preferably creates an electric field 250 which is coherent and proportional to the electric field potentials produced by electrodes 206 and 205 which couple back to electrodes 206, 205 through the mutual capacitances 207, 204 respectively emulating a touch event 227.

If the capacitive touch sensor array 201 is operating in mutual capacitance mode, the transmitting electrode 205 is stimulated with voltage pulses by electrode driver 213 and received by electrode 206 through the mutual capacitance 212. The mutual capacitance 212 between electrodes 205 and 206 is determined by the amount of signal coupled from the transmitting electrode 205 to the receiving electrode 206 which is measured by the capacitive sense module 217. The touch emulation probe 202 preferably couples to the electric field potential produced by the transmitting electrode 205 through mutual capacitances 208. Subsequently, the touch emulation apparatus 200 preferably creates an electric field 250 which is coherent and proportional to the electric field potential produced by transmitting electrode 205 which couples to the receiving electrode 206 through the mutual capacitances 204 and emulates a touch event 227. Preferably the touch emulation apparatus 1, produces electric fields during the scan time 358 of a plurality of electrodes surrounding the touch emulation location creating an emulated touch event 227 with an accurate centroid. It is a feature and advantage of the current invention for the apparatus to monitor the electric field produced by the capacitive sensor array 201, and create a coherent electric field 250 which couples to the electrodes 218-226 inducing voltages which emulates touch event 227.

Multi-Touch Emulation

The application processor 28 initiates a multi touch event by preferably requesting the emulation processor 33 to create a plurality of emulated touch events at the array of locations defined by 37, preferably the number of emulation events ranges between 2 and 5 emulation events corresponding to emulating between 2 and 5 finger multi-touch events but is not limited to 5. The emulation processor 33 preferably receives the electrode scan schedules 21 on 36 for the capacitive sensor array 100 which specifies each electrode scan time 358 and also receives an array of two dimensional coordinates specifying the locations 37 to generate each touch event. The transmit electric field intensity interpolator 35 computes the relative electric field intensities 43 to be produced during each scan interval 356 for each electrode scan duration 370 to result in an emulated touch event that will have a centroid at each of the plurality of two dimensional locations 37. Preferably the electric field intensity interpolator 35 computes the intensity 43 in accordance with equation 10 for each of the touch event locations 37. When emulating a plurality of multi-touch events the transmit electric field synthesizer 44 preferably synthesizes an electric field output signal 48 for each of the plurality of touch emulation event locations 37, which are preferably a square waveform voltage with an amplitude determined by the electric field intensity 43, a frequency defined by scan frequency 23 on input 40, a phase defined by the scan phase input 38 and a duration defined by the scan duration 20 on input 39. Other waveforms could be synthesized including triangular, sinusoidal or arbitrary waveforms and are still within the spirit of the invention.

When emulating multi-touch events the electric field modulator 45 preferably receives the enumerated set of electric field signals 48 from the electric field synthesizer 44 which correspond to the plurality of emulation events for the current scan interval 356 and the modulator 45 preferably also receives an array of transmit data binary signals 41 from the application processor 28. The modulator 45 preferably amplitude shift key modulates each signal of the electric field enumerated set 48 with the corresponding data from the transmit data array entry 41, thus enabling unique data to be modulated on each emulated touch event. Modulating multiple touch events each with unique data enables the touch emulation apparatus 1 to communicate binary data to the capacitive sensor array 100 on a per touch event basis. The application interpreting the capacitive sensor array 100 touch events preferably receives the data 41 from the amplitude shift key modulation of the emulated touch events. Other modulation schemes could preferably be implemented by the Electric Field Modulator 45, including frequency modulation and phase modulation and are within the scope of the present invention. It is a feature of the present invention to create modulated emulated touch events for palm or finger rejection wherein any touches that are not modulated would preferably not be interpreted as a touch event by the application interpreting the capacitive sensor array 100 outputs. Additionally, it is a feature of the present invention to provide a high data rate modem communication method between the touch emulation apparatus 1 and the application interpreting the capacitance sensor array 100 outputs by modulation of multiple emulated touch events.

A preferred generalized method for emulating multiple touch events is summarized as:
A preferred method to emulate multiple touch events
1) Receive scan electric fields from scan electrode
2) For each scan electrode-n
   a. Determine Electrode n-scan time(n), scan frequency (n), scan waveform(n), scan duration(n)
3) For each scan interval between start scan interval and end scan interval
   a. For each touch emulation location −m
      i. For each scan electrode-k
         1. Synthesize electric field (k)—at scan time (k), with scan frequency(n), intensity(n)=TX Vproben determined by equation 10

Multi-Touch Gesture Emulation.

The application processor 28 initiates a multi touch gesture event by preferably requesting the emulation processor 33 to create a plurality of emulated touch events, preferably between 2 and 5 emulation events corresponding to emulating between 2 and 5 finger multi-touch events but is not limited to 5. The emulation processor 33 preferably receives the electrode scan schedule 21 for the capacitive sensor array 100 which specifies the electrode scan time 358 and also receives an array of two dimensional coordinates specifying the locations 37 to generate each touch event. The array of two dimensional locations 37 is preferably time varying for each scan interval 356, enabling the location 37 of touch emulation events to animate between scan intervals 356 as a function of time, defining a two dimensional gesture. The transmit electric field intensity interpolator 35 computes the relative electric field intensities 43 to be produced during each scan interval 356 for each electrode scan duration 370 to result in an emulated touch event that will have a centroid at each of the plurality of two dimensional locations 37 wherein the plurality of two dimensional locations 37 are time varying for each scan interval 356. Preferably the electric field intensity interpolator 35 computes the intensity 43 in accordance with equation 10 for each of the touch event locations 37.

FIG. 6 presents an example of a two dimensional emulated finger gesture on a capacitive sensor array 100. Other capacitive touch sensor array scan topologies are possible but are considered within the spirit of the invention. In this example Electrodes 601-612 of capacitive sensor array 100, are scanned during each scan interval 356. The touch emulation apparatus 600 is preferably located at an arbitrary location on the capacitive touch sensor array 100. The touch emulation probe 630 preferably couples to the electric field potential produced from electrodes 601-612 to the electric field detector 4. The electric fields are preferably amplified and digitized by the Electric Field Detector 4, and passed 60-62 to the Receive Signal Processor 11. The Receive signal processor 11, preferably determines the scan duration 20, scan schedule 21, scan sequence 22 and scan frequency 23, for electrodes 601-612 collectively referred to as electrode scan waveforms, and orientation 24, movement 25, XY Position 26, and Hover Position 27. The electrode scan waveforms are preferably passed to the Application Processor 28. During scan interval N, the application processor 28 requests the emulation processor 33 to create two emulated touch events at location x0, y0 623 and a location of x1, y1 624. The emulation processor 33 triggers 42 the electric field synthesizer 44 to produce an electric field coincident to each electrode scan time 358 and coherent and proportional to each electrode scan waveform for preferably a subset of the scan electrodes 601-612 surrounding the touch emulation point 623 and 624. The electric field intensity interpolator 35 solves equation 10 and determines the electric field intensity 43 to couple to a subset of the scan electrodes 601-612 to form a centroid for each emulation point 623, 624. The Scan Interval N Transmit electric field intensity 650 chart displays the relative electric field intensity produced by the electric field synthesizer 44 as a function of time coincident to the scan time 358 of each electrode 601-607. To produce the emulated touch event with a centroid at 623, and 624, the electric field synthesizer 44 produces an electric field 653 that is coincident with the electrode 601 scan time 358, and coherent with the electrode 601 scan waveform. Additionally synthesizer 44 produces an electric field 654 coincident with the electrode 602 scan time 358, and coherent with electrode 602 scan waveform. In a similar pattern, the synthesizer 44 produces electric fields with intensity 655, 656, 657, 658 on 43 and scan frequency 23 on 40, scan duration 20 on 39, and scan phase 38 at electrode 603-606 scan times 358 resulting in emulated touch events 623 and 624.

Similarly, during scan interval N+1 670, the application processor 28 preferably requests the emulation processor 33 to create two emulated touch events at location x2, y2 622 and a location of x3, y3 625. The electric field synthesizer 44, produces electric fields with intensity 673, 674, 675, 676, 677, 678 on 43 and scan frequency 23 on 40, scan duration 20 on 39, and scan phase 38 at electrode 601, 602, 603, 604, 605, 606 scan times 358 resulting in emulated touch events 622 and 625.

Similarly, during scan interval N+2 690, the application processor 28 preferably requests the emulation processor 33 to create two emulated touch events at location x4, y4 621 and a location of x5, y5 626. The electric field synthesizer 44, produces electric fields with intensity 693, 694, 695, 696, 697, 692 on 43 and scan frequency 23 on 40, scan duration 20 on 39, and scan phase 38 at electrode 601, 602, 603, 604, 605, 606 scan times 358 resulting in emulated touch events 621 and 626.

The two time sequences of emulated touch events 623, 622, 621 and 624, 625, 626 animated during time spanning scan interval N, N+1 and N+2 emulate a two finger gesture movement. A preferred generalized method for emulating gesture movements is summarized as:

A preferred method to emulate a gesture
1) Receive scan electric fields from scan electrode
2) For each scan electrode-n
   a. Determine Electrode n-scan time(n), scan frequency (n), scan waveform(n), scan duration(n)
3) For each scan interval between start scan interval and end scan interval
   a. For each touch emulation location –m
     i. For each scan electrode-k
       1. Synthesize electric field (k)—at scan time (k), with scan frequency(n), intensity(n)=TX Vproben determined by equation 10.
     ii. Advance touch emulation location(m)

FIG. 7, shows a preferred embodiment wherein the apparatus is a stylus 700 and 701. The stylus 700 preferably has a plurality of slider controls 702 which enable the user to trigger configurable gesture events 620-623 and 624-627. Additionally, the stylus 700 has a plurality of button controls 703 which enable the user to trigger configurable touch events 227.

While the above description contains many specifics, these should not be construed as limitations on the scope of the invention, but rather as an exemplification of one preferred embodiment thereof. It will be obvious to those skilled in the art that many modifications and alterations may be made without departing from the spirit and scope of the invention which should be determined not by the embodiments illustrated, but by the appended claims and their legal equivalents.

What is claimed is:

1. An apparatus to create an emulated gesture on a capacitive touch sensor array comprising: one or more receive probes to receive an electric field emitted as a function of time from one or more first transmitting electrodes of said capacitive touch sensor array, an electric field detector for measuring said electric field; a mutual capacitance processor for determining a distance between said one or more receive probes and each said one or more first transmitting electrodes from a measured electric field; a predictive scan pattern processor to infer electrode scan waveform of one or more second transmitting electrodes from said measured electric field, wherein said one or more second transmitting electrodes includes some, none or all of said one or more first transmitting electrodes; an application processor to determine a sequence of contiguous emulated touch event locations which corresponds to said emulated gesture on said capacitive touch sensor array relative to said one or more receive probes and each said first transmitting electrodes; an electric field synthesizer to create a time variant electric field in accordance with said electrode scan waveforms, for a subset of said second transmitting electrodes, which couples to one or more receiving electrodes of said capacitive sensor array to form an emulated touch event wherein a centroid of said emulated touch event traverses along said sequence of contiguous emulated touch event locations as a function of time thereby animating said gesture.

2. Apparatus of claim 1, wherein location of said apparatus on said capacitive touch sensor array is arbitrary relative to said sequence of contiguous emulated touch event locations.

3. Apparatus of claim 1, wherein said gesture emulates a single finger swipe gesture; wherein said sequence of contiguous emulated touch event locations are animated consecutively as a function of time between a start location and a stop location thereby rendering said single finger swipe gesture.

4. Apparatus of claim 1, wherein said gesture emulates a two finger gesture; wherein said sequence of contiguous emulated touch event locations are comprised of a first sequence of contiguous emulated touch event locations and a second sequence of contiguous emulated touch event locations; said first sequence of contiguous emulated touch events locations are animated consecutively as a function of time between a first start location and a first stop location; and said second sequence of contiguous emulated touch events locations are animated consecutively as a function of time between a second start location and a second stop location thereby rendering said two finger gesture.

5. Apparatus of claim 1, wherein said gesture emulates a three finger gesture; wherein said sequence of contiguous emulated touch event locations are comprised of a first sequence of contiguous emulated touch event locations, a second sequence of contiguous emulated touch event locations, and a third sequence of contiguous emulated touch event locations; said first sequence of contiguous emulated touch event locations are animated consecutively as a function of time between a first start location and a first stop location; and said second sequence of contiguous emulated touch event locations are animated consecutively as a function of time between a second start location and a second stop location; and said third sequence of emulated contiguous touch event locations are animated consecutively as a function of time between a third start location and a third stop location thereby rendering said three finger gesture.

6. Apparatus of claim 1, further comprising a 3 dimensional hover coordinate interpolator to determine a height of said apparatus relative to said capacitive touch sensor array or a pressure applied by said apparatus against said capacitive touch sensor array.

7. Apparatus of claim 1, further comprising a movement processor for determining a rotation, a magnitude of velocity or a direction of movement of said apparatus or any combination thereof, by differentiating as a function of time said distance between said one or more receive probes and each said one or more first transmitting electrodes.

8. Apparatus of claim 1, further comprising an electric field modulator to encode transmit data on said time variant electric field created by said electric field synthesizer to communicate said transmit data to an application associated with said capacitive touch sensor array.

9. Apparatus of claim 1, further comprising a user control to enable said apparatus to emulate a single instance of said gesture or repetitive instances of said gesture.

10. Apparatus of claim 1, wherein said apparatus is a stylus.

11. Apparatus of claim 1, wherein said apparatus is a game controller.

12. An apparatus to create an emulated touch event on a capacitive touch sensor array comprising: one or more receive probes to receive an electric field emitted as a function of time from one or more first transmitting electrodes of said capacitive touch sensor array; an electric field detector for measuring said electric field; a mutual capacitance processor for determining a distance between said one or more receive probes and each said one or more first transmitting electrodes from a measured electric field; and a predictive scan pattern processor to infer electrode scan waveform of one or more second transmitting electrodes from said measured electric field, wherein said one or more second transmitting electrodes includes some, none or all of said one or more first transmitting electrodes; an application processor to determine an emulated touch event location on said capacitive touch sensor array relative to said distance between said one or more receive probes and each said first transmitting electrodes; an electric field synthesizer to create a time variant electric field in accordance with said electrode scan waveforms, for a subset of said second transmitting electrodes, which couples to one or more receiving electrodes of said capacitive sensor array to animate said emulated touch event with a centroid at said emulated touch event location.

13. Apparatus of claim 12, wherein location of said apparatus on said capacitive touch sensor array is arbitrary relative to said sequence of contiguous emulated touch event locations.

14. Apparatus of claim 12, further comprising a 3 dimensional hover coordinate interpolator to determine a height of said apparatus relative to said capacitive touch sensor array or a pressure applied by said apparatus against said capacitive touch sensor array.

15. Apparatus of claim 12, further comprising a movement processor for determining a rotation, a magnitude of velocity or a direction of movement of said apparatus or any combination thereof, by differentiating as a function of time said distance between said one or more receive probes and each said one or more first transmitting electrodes.

16. Apparatus of claim 12, further comprising an electric field modulator to encode transmit data on said time variant electric field created by said electric field synthesizer to communicate said transmit data to an application associated with said capacitive touch sensor array.

17. Apparatus of claim 12, further comprising a user control to enable said apparatus to emulate a single instance of said emulated touch event or repetitive instances of said emulated touch event.

18. Apparatus of claim 12, wherein said apparatus is a stylus.

19. A method for emulating a multi-touch gesture on a capacitive touch sensor array which consists of the steps of: measuring an electric field generated from one or more first transmitting electrodes of said capacitive touch sensor array; defining one or more sequences of contiguous emulated touch event locations corresponding to said emulated multi-touch gesture on said capacitive touch sensor array wherein said one or more sequences of contiguous emulated touch event locations are arbitrary relative to locations of said one or more first transmitting electrodes and determined from a measured electric field; predicting electrode scan waveforms of one or more second transmitting electrodes at said sequence of contiguous emulated touch locations which span said emulated multi-touch gesture, said one or more second transmitting electrodes including some, none or all of said one or more first transmitting electrodes; synthesizing a time variant electric field in accordance with said electrode scan waveforms, for a subset of said second transmitting electrodes, which couples to one or more receiving electrodes of said capacitive sensor array to form an emulated touch event wherein a centroid of said emulated touch event traverses along said one or more sequence of contiguous emulated touch event locations as a function of time thereby animating said emulated multi-touch gesture.

20. Method of claim 19, further comprising the step of: transmitting data to an application associated with said capacitive touch sensor array by modulating said synthesized time variant electric field to encode said transmit data.

\* \* \* \* \*